Patented Sept. 12, 1939

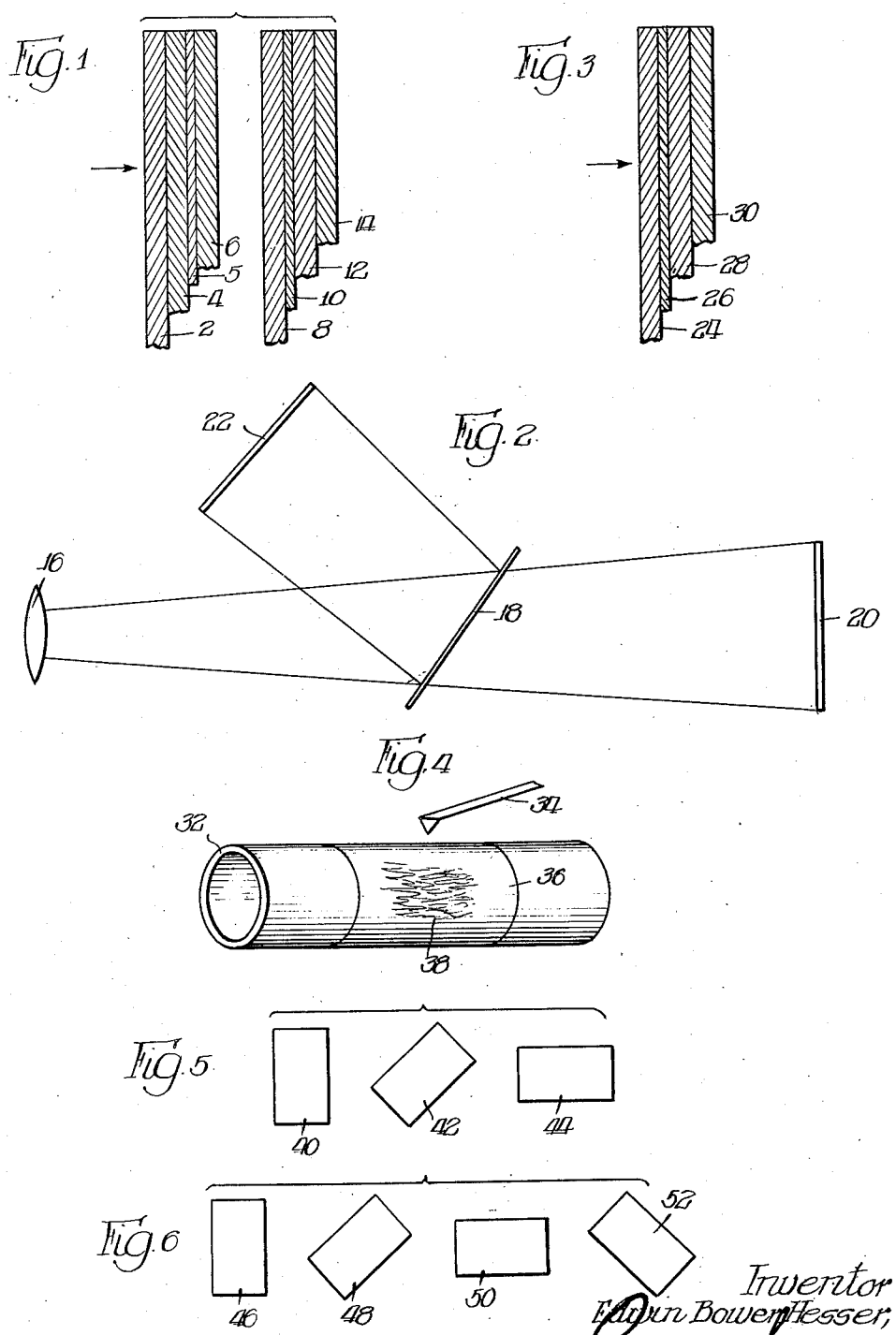

2,172,818

UNITED STATES PATENT OFFICE 2,172,818

ELECTRICAL TRANSMISSION OF COLOR PHOTOGRAPHY

Edwin Bower Hesser, West Hollywood, Calif., assignor, by mesne assignments, to Photocolor Corporation of America, a corporation of California Application March 12, 1937, Serial No. 130,488

8 Claims. (Cl. 178—5.4)

This invention relates to the electrical transmission of natural color photographs. By the expression "electrical transmission" it is intended to include all methods of electrical transmission of photoelectric cell impulses determinable by a degree of contrast in a print of a photographic subject being transmitted, and including the use of telegraphic, telephonic, cable, radio and television methods of transmission.

It has been known in the art of photography for many years that the production of color separation negatives may be effected by the exposure in sequence of panchromatic light sensitive photographic material behind color filters, and sets of negatives so produced may be generally designated by the term of color separation negatives. The terms negative and positive as herein used are readily interchangeable inasmuch as it is photographically possible and feasible to change any negative into a positive by the simple process of copying. It is equally possible to copy negatives in such a manner that a negative will result by one exposure of sensitized material in relation to the original negative, such production being effected by the use of self-reversing light sensitive materials.

The designation in this specification of "photographic film" generally includes all light sensitive photographic image producing materials whether supported by glass, celluloid or self-supporting. The term "emulsion" includes any layer or coating of light sensitive material capable of producing an image or contrasts by means of light exposure. The term "copying" embodies any separation by which an image is produced upon another photographic surface from any previously recorded photographic image. The operations of separating and copying emulsions or layers upon new independent negative material are called "selective copying". The term "nearest lens during exposure" is synonymous with "first layer" of any superposed combination of photosensitive material, the succeeding layers in superposition thus being relative farther, and finally farthest, from the lens during exposure or from the point of contact in contact printing without the use of a lens.

In the various types of films hereinafter described the term "mono-pack" is a coined term used to cover a single transparent support for multiple emulsions in superposed strata capable of making a complete color picture, no other film outside of the mono-pack being required to be exposed. Thus, in accordance with the terminology used herein, a single support containing multiple film emulsions to be exposed simultaneously with another emulsion of any kind is not a monopack. The term "bi-pack" is well known in the art. A bi-pack as used in the art consists of two single emulsions, each supported by an independent transparent support. The emulsions are arranged face to face during exposure as in the case of the trade-named "Du-Pac" which consists of a blue-green sensation recording emulsion on the front transparent support covered by an overlay filtrational coating, orange-red in color. The second support has upon it a single panchromatic film which under the influence of the red filter covering emulsion on the first support records red sensations.

When reference is made to a bi-pack it ordinarily never means anything but association of two independent supports in optical contact, each of these supports having cohesionally associated light sensitive photographic emulsions. Thus, if elements composing a bi-pack are taken apart, they are no longer a bi-pack. The exposure therefore of two separate sets of emulsions in different parts of a camera is not a bi-pack in the photographic sense, but in the present specification the term bi-pack has been used to cover dual element films which may be used either in superposition or separately in dual split-beam cameras. The term "tri-pack" is used to describe a film consisting of three separate photographic elements, each of which contains one or more emulsions and which may be used in superposition or at separate points of exposure in multi-beam cameras.

It is an object of this invention to provide a means of electrically transmitting color photographs. A further object is the provision of a method for the electrical transmission of shadow sensation recordings in multi-color photography. A still further object is the provision of a method for the electrical transmission of color separation negatives without making positives, thereby saving time and expense. Another object is the utilization of an image whitener in electrically transmitting color photographs. A further object is the provision of a method of electrically transmitting color photographs in which a transparent photographic material is employed in the transmitting and receiving stations to respectively send and receive the image transmitted. Other objects will appear hereinafter.

According to its broader aspects, the invention contemplates the preparation of mono-tone recordings of differing color sensations and the transmission of these recordings separately by electrical impulses to a point distant from the point of origin, and associating at the point of destination the transmitted mono-tone separation recordings. After association at the point of destination the transmitted mono-tone separation recordings may be employed to complete a natural color photograph, for example, by engraving separately from each of the multiple prints after transmission upon a printing plate in any manner known in the graphical arts, printing one of the plates so produced in the color complementary to its color record, resetting the separation with another plate utilizing inks complementary to the sensation record thereof, superposing the imprint of the second plate in register over the first, and resetting the separation until all plates of a multiple series have been printed, thus completing a natural color photograph.

In the electrical transmission of pictures in natural color, whether drawings, paintings or photographs, there are many variations of technique in accordance with the invention, but in each case the essential feature is a set of color separations. These separations may be either color separation positives or color separation negatives. They must be of exact geometric identity and of the same size and should accurately portray the correct contrasts of light and shade in each printing color which the separation represents. Thus, it is essential that whatever separations are used for electrical transmission they shall be of balanced density regardless of whether positives or negatives are employed.

The colored object may be photographed on a photographic element in the form of a single element comprising emulsions or layers capable of recording multi-color sensations, that is, a mono-pack; or it may be photographed on a dual element film comprising two supports each containing one or more different color recording emulsions exposed in optical contact. Alternatively, the photographic film upon which the object is photographed may consist of three supporting elements, each of which contains one or more differing color sensation recording emulsions. Any of these types of photographic films when used in superposition will serve to record the colors of the object photographed in one or more colors, according to the number of different types of emulsions present in the film. It will be recognized that a wide number of variations may be made in the type of film and in the arrangement of the emulsions.

In addition to providing a method for the electrical transmission of natural color photographs in one, two or three colors, the present invention provides a means for electrically transmitting shadow sensation recordings. The expression "shadow sensation recording", while not previously known in the art, is aptly and correctly descriptive in that it refers only to recordings of shadow, including black and gray, and not to individual recordings of color sensitivities. In accordance with the present invention, the preferred types of film employed to take a photograph for electrical transmission comprise a green or blue sensation recording emulsion followed by a red sensation recording emulsion, the green or blue sensation recording emulsion usually being separated from the red sensation recording emulsion by a suitable filter layer.

A preferred type of shadow sensation recording negative utilized in the present invention comprises a green sensation recording emulsion nearest the camera lens during exposure with a panchromatic material behind it on the same transparent support and a filter layer interposed between said emulsions, preferably red or orange-red in color. This filter layer may be water-solubly dyed or dyed with a dye which although not water-soluble may be removed by bleaching, for example, with aqueous sodium hydrosulphite. The filter layer ahead of the panchromatic material causes it to be red sensation recording and thus the finished shadow sensation recording negative consists of a dual emulsion which is both green sensation recording and red sensation recording.

Another preferred type of shadow sensation recording light sensitive photographic material utilized in the present invention comprises an element in succession as follows: a Celluloid, glass or other transparent support, a blue sensation recording emulsion, a yellow gelatine filter layer, a red recording emulsion. The yellow filter layer must be so colored as to be insoluble in water, developer or hypo solutions but preferably removable by bleaching in aqueous sodium hydrosulphite. Thus the finished shadow sensation recording negative consists of a dual emulsion which is both blue sensation recording and red sensation recording.

It will be recognized that many variations and modifications may be made in the usage of the shadow sensation recording negative. For instance, the complete film may consist of two negatives, one of which is shadow sensation recording, the other being a multi-color sensation recording negative containing a red sensation recording emulsion. The finished film may also consist of three negatives, one of which is shadow sensation recording, and the others being capable of recording one or more colors. It is also possible in accordance with the invention to prepare a single negative containing multi-color sensation recording emulsions and adapted, after exposure and transfer of one or more of these emulsions to another support, to be used as a shadow sensation recording negative.

As an illustration of a suitable mono-pack may be mentioned a film containing three layers of differing color and light selective sensitivities and a suitable arrangement of supports and filters as follows: A blue sensation recording orthochromatic negative emulsion nearest the camera lens during exposure; a yellow gelatin layer immediately following; then a green sensation recording emulsion followed by a red gelatin filter layer and finally a panchromatic emulsion attached to a suitable transparent support, the last named emulsion being red sensation recording in view of the red gelatin filter layer.

A preferred type of bi-pack is as follows in the order nearest the lens during exposure: A Celluloid support, a blue sensation recording emulsion, and a red sensation recording emulsion forming the first element, and a green sensation recording emulsion, a gelatin layer water-solubly dyed red, and a panchromatic emulsion layer in that order forming the second element. This second element also preferably contains an anti-halation backing layer.

Another preferred type of bi-pack is as follows in the order nearest the lens during exposure: A transparent glass or Celluloid support, a blue sensation recording emulsion, a yellow filter layer, and a red sensation recording emulsion forming the first element, the second element comprising a green sensation recording emulsion affixed to a transparent support, the back of which is preferably coated with a red anti-halation backing layer.

A suitable form of tri-pack consists of three elements containing the emulsions and supports in the following order from the nearest lens during exposure: A transparent Celluloid support followed by a blue sensation recording emulsion and then a filtrational layer water-solubly dyed yellow forming the first element; a green sensation recording emulsion followed by a transparent Celluloid support and then a thin gelatin coating water-solubly dyed red forming the second element; and a panchromatic emulsion on a Celluloid support preferably with an anti-halation backing layer forming the third element. In view of the several supports all of these elements should be very thin, preferably not exceeding .005 inches in thickness.

Another form of tri-pack, particularly valuable in electrical transmission because of clarity of the red record negative, because of its position nearest the lens, consists of three transparent supports for three differing emulsions of selective sensitivities, as follows: First element, Celluloid support, red record emulsion integrally yellow dyed; second element, green record emulsion, Celluloid support; third element, blue record emulsion, Celluloid support, anti-halation backing layer.

The foregoing types of films may be used in any suitable type of camera in superposition. It is also possible in accordance with the invention to use multi-beam cameras. With the usual type of bi-pack now known in the art, as, for example, "Du-Pac", the bi-pack is placed at one of the focal points of a split-beam camera and at the other exposure position as used in present day practice there is placed a panchromatic negative emulsion with an interposed green filter. Thus, with a bi-pack such as Du-Pac the first element records blue sensations, the second element red sensations, and the panchromatic element with the green filter, green sensations, completing a tri-color set of color separation negatives. In making natural color photographs with multi-beam cameras for electrical transmission, I prefer to use a film consisting of two elements, one of which is blue and red sensation recording, and the other of which is red and green sensation recording, the first element being placed at one focal point of a dual-beam camera and the second element at the other focal point with a yellow filter. This second element upon development becomes a green sensation recording element and also a shadow sensation recording element, the blue and red sensation recordings being obtained from the first element. Instead of this first element, I may employ the ordinary bi-pack such as Du-Pac. In a similar manner I may use a shadow sensation recording element at one of the focal points of a tri-beam camera while recording one or more of the other color sensations at the other focal points.

The methods of development and copying are subject to considerable variation, depending to a large extent upon the type of film. In general, copying is preferably effected with polarized light which is preferably colored to provide required contrast between the image and the colored background of the emulsion. The required depth and gradation is obtained by rotating a polarizing screen in front of the camera lens in a copying operation in coordination with rotation of light polarizing filters upon the source of light. Ordinary regenerated cellulose, that is, "Cellophane", when placed in cohesional contact with an image-bearing emulsion to be copied, lighted with polarizing screens and photographed with a lens controlled by the polarizing filter, is a distinct aid to clarity and visibility of contrast. Alternatively, a thin sheet of another type of transparent polarizing material, such, for example, as "Polaroid", in front of the object to be copied, associated in operation with the adjustment of a polarizing filter over the lens and upon the source of light, provides another accurate means for selective copying.

A second method of selective copying which may be utilized in accordance with this invention and in which the above described method of using polarizing material is valuable as a convenience, but entirely optional, is as follows. A film composed of interposed, differently sensitized emulsions for color recordings of various points of the spectrum is exposed in photographing an object within a camera. The next operation is photographic development but the use of the usual hypo-fixing bath is postponed. Instead, the film after development is immersed in an acid bath adapted to act as a shortstop and hardener, but which leaves the unexposed silver content of the film undissolved in the form of a substantially opaque layer. This acid bath may be the usual type of acid stop-bath used in the art but without the sodium thiosulphate added thereto. Either while wet or after drying, the black image appearing upon the background of the undeveloped emulsion may be copied with great accuracy with the copying camera, employing polarization of light as heretofore described. Ordinary copying methods may also be used with these acid stopped but unfixed emulsions. In either case, after copying, where the film contains the dual combination of a green sensation recording emulsion followed by a red sensation recording emulsion, this dual transparent negative combination may be fixed in hypo for use as a shadow sensation black positive key printing negative.

According to a third and preferred method of development used in this invention, a film composed of superposed sensitized emulsions of differing color recording selective sensitivities is developed, fixed and washed in the usual way. Instead of drying after washing, the film is immersed in a solution which may be as follows:

| | Ounces |
|---|---|
| Mercuric chloride | 2 |
| Potassium bromide | 2 |
| Distilled water | 64 |

This treatment has the effect of turning the silver forming the images into a combination of silver chloride and mercurous chloride which are white in color. Instead of mercuric chloride, mercuric iodide or other water-soluble salt forming a white water-insoluble silver salt may be used. The operation of selective copying follows, in which the record of the green sensation emulsion (assuming the film comprises a green sensation emulsion and a red sensation emulsion on a support) is conveyed to a new independent emulsion upon an individual support. Polarized light or simple photographing of the whitened image may be employed. This whitener of images employed after developing, fixing and washing permits the copying of images from both sides of a negative when there is a dark layer in between them. Either in whitened state or blackened by immersion in a weak solution of ammonia, the dual transparent negative combination may be utilized as a shadow sensation black positive key printing negative.

Where the negative contains more than two color recording emulsions, as, for instance, in a mono-pack, I have found that it is possible by local application to apply to one side of the film a bleaching chemical, as, for example, a cold dilute solution of potassium permanganate acidified with sulphuric acid which has the virtual effect of destroying the density of a surface emulsion. Thus, in developing a mono-pack where the order of emulsions nearest the camera lens is blue, green and red, as in one of the examples previously given, the film is exposed and after exposure developed and the image whitened by treatment with mercuric chloride. The blue sensation recording emulsion is then selectively copied and thereafter eliminated by treatment with a bleaching solution as above described. The green and red sensation recording emulsions can then be copied from opposite sides of the negative and the residual green and red sensation recording emulsions upon the original support used as a shadow sensation recording, thus keeping a correct quadri-color negative set.

A fourth method of developing and copying a dual emulsion negative is as follows: After exposure the film is developed in black to make visually apparent silver images, immersed in an acid-stop bath to stop developer action, then immersed in a color bath solution to color the undissolved emulsion. Then, after selectively copying one image, the residual film is immersed in a solution containing mercuric chloride to whiten the black silver image, fixed and bleached to remove undissolved emulsions and coloring matter, and the two negatives are copied in interposed combination as a negative jointly combining the qualities of the two component negatives.

Other variations may be made. For instance, the film may be developed in the usual manner but without fixing, immersed in an acid-stop bath to stop developer action, then washed and immersed in an appropriate dye bath to enhance contrast between the black silver images formed by light and the remainder of the film unexposed to light and the resulting contrast obtained in the areas of partial light exposure; then the images contained in each emulsion copied from opposite sides of the film.

One of the methods of development for electrical transmission involves the method of developing but not fixing the negative on the transmitting end in connection with the use of transparent material (film) on the receiving end, which would be turned over in usage. Otherwise, one or more of the images might read backwards if lettering were photographed. A preferred method of development for electrical transmission is the image whitening method described above. According to this method, a negative may be transmitted while still wet. The transition of the black normal image to the white image makes transmission possible without making a positive print. This method may be used to advantage in the type of tri-pack previously described in which each negative contains only a single color recording emulsion. However, it may be used even where the negative is a dual emulsion negative because it permits copying of images from both sides of a negative when there is a dark layer in between.

This whitening of the image on the negative not only saves time but avoids the uncertainties incidental to errors in the geometricity of paper prints. Where, because of the super-position of emulsions in contact or on account of the use of beam splitting devices the images are positionally reversed in the depiction of the objects photographed, the whitened image may be electrically transmitted through the back of the negative support using a dark background during electrical transmission.

In practicing the invention according to the preferred method of four-color transmission, it is preferable to make the photograph with a special bi-pack of the type previously described in superposed simultaneous exposure, or, in a split-beam camera, using a shadow sensation recording element (e. g., an element comprising a green sensation recording emulsion followed by a red filter layer and a panchromatic emulsion on a suitable support) with a yellow filter in one of the focal positions and employing the usual type of bi-pack such as "Du-Pac" or another type of blue and red sensation recording element in the other focal position. The film is then developed and a print made of the shadow sensation element (green-red). It is possible in one operation to produce a negative by using a standard type of duplicating film, e. g., "Agfa direct duplicating film". This special film makes negative from negative or positive from positive in ordinary developing. This may be accomplished even if the negative has been so developed that the images thereon have been changed from black to white. The density thereof not having been changed, the dual emulsions act correctly as a single negative in printing or electrical recording by transmitted light through the dual emulsions as a transparency.

Following transmission of the shadow sensation print, the green sensation record may be readily copied by putting the negative directly upon the transmitter and copying to a distant point in a manner known and usual to the transmission of ordinary photographs. Similarly, the blue and red sensations may be transmitted, completing transmission in four colors.

For electrical transmission of positive color separations the following procedure may be used. The object is photographed with a tri-pack film of the type previously described and the three separate films are developed in the ordinary manner to complete a set of color separation negatives proper for printing in yellow, red and blue respectively. When all three of these negatives are placed in perfect register after being washed and dried, they completely filter out all colors except the shadows required for black printing. Hence, a black printing negative may be made from these three finished negatives in contact for exposure with a direct duplicating film, thus completing a quadri-color negative set. Positive prints on paper are then made from each of the separation negatives and these positive prints are compared for proper density in relation to each other by means of a gray scale. After the density has been determined, prints from each separation negative are made in monotone upon single prestretched sheets of regenerated cellulose (Cellophane), each being developed and mounted on a rigid transparent support. This may be effected as described in my co-pending application Serial No. 741,033, filed August 23, 1934.

The individual component transparent monotone prints are compared for identity of registration and the three or four component prints are each separately transmitted by wire to the point of destination. At the point of destination, each of the three or four positive prints received is engraved in halftone engraving in the color properly associated with the taking of the picture, that is, in the complementary color to the sensation recorded by the original negative material used in photographing. Printings in various colored inks corresponding correctly to the original negative are superposed in register to produce a natural color picture.

Other features of the invention will become apparent from a reading of the following description in the light of the accompanying drawings, in which Figure 1 represents a preferred type of film to be used in electrical transmission of multi-color photography;

Figure 2 diagrammatically represents a camera of the split-beam type;

Figure 3 represents a film suitable for color sensation recording and shadow sensation recording;

Figure 4 is a diagrammatic representation of one form of transmitter for photographs;

Figure 5 represents a method of positioning the positives or negatives to be transmitted on the transmitter where three color separations are used;

Figure 6 illustrates a method of positioning the color separation negatives or positives in electrically transmitting quadri-color photography;

Figure 7:
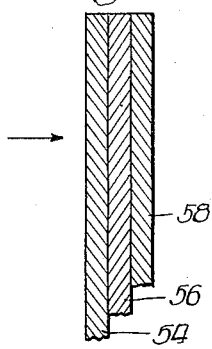
Figure 7 represents a film element suitable for green sensation recording and adapted to be used as the rear element of a bi-pack film.

The arrow in each figure indicates the direction of the light rays entering the film during exposure.

Referring to Figure 1, the one form of film illustrated comprises as one element a transparent support of glass or Celluloid 2, a blue sensation recording emulsion 4, a yellow gelatin filter layer 5, non-water soluble but soluble in aqueous sodium hydrosulphite, and a red sensation recording emulsion 6, and as a second element a green recording emulsion 8, a filter layer 10 water-solubly dyed red, a panchromatic emulsion 12 and a transparent support 14.

The object in natural colors is photographed on this film with the light rays entering the first element of the film in the direction of the arrow, as illustrated. The second element of the film is an optical contact in the position shown in Figure 1 during exposure, thereby producing separate records of three colors in the various emulsions.

Separation negatives may be developed and transmitted according to one of the methods previously described, preferably by the image whitening method.

In Figure 2, the split-beam camera diagrammatically illustrated comprises a lens 16, a reflecting transmitting mirror 18, a photographic element or film 20 at one of the focal points and another photographic element or film 22 at the other focal point. The light rays entering the lens 16 pass to the reflecting transmitting mirror 18, which is semi-transparent, splitting the rays of light so that they fall on focal point 20 by transmitted light and focal point 22 by reflected light.

In this type of camera, it is possible to produce a correct series of color separation records for wire or radio transmission by placing the first element of the bi-pack shown in Figure 1 at focal point 20 and the second element, that is the shadow sensation recording element, at focal point 22. Alternatively, a shadow sensation element as shown in Figure 3 may be used in this type of camera with the ordinary type of bi-pack, such as "Du-Pac."

The shadow sensation element of Figure 3 comprises a high green sensation recording emulsion 24, a red filter layer 26 which may be water-solubly dyed or dyed in such a way that the dye can be removed with aqueous sodium hydrosulphite, a panchromatic emulsion 28 for red sensation recording and a Celluloid transparent support 30. This film of Figure 3 may be placed for exposure at focal point 20 in the split-beam camera illustrated in Figure 2, a bi-pack, such as "Du-Pac," being placed at focal point 22 for blue and red sensation recording. After exposure the blue and red sensation recording emulsions may be made directly from the two negatives of the bi-pack at focal point 22 and the green sensation and shadow recording negatives are developed from the photographic element at focal point 20.

The wire photo transmitter diagrammatically illustrated in Figure 4 is one form of known transmitter for photographs in which the picture to be transmitted is placed upon a sending cylinder 32 and is scanned by a photoelectric cell 34 mounted upon a sliding arm of any suitable type. The picture to be transmitted 36 is usually mounted upon paper, Celluloid or other flexible material, preferably transparent in accordance with the principles heretofore described. In Figure 2, the image is represented by symbol 38.

The rotation of the cylinder with the sliding arm bearing the photoelectric cell serves to produce any sensation images or contrasts on the picture being reproduced in a manner comparable to the recordings of speech or music on cylindrical phonograph records. The electrical impulses reproduce at the receiving terminal of the transmission line or radio a picture comprising contrasts made up of lines of varying density very often producing the effect in the transmission of a monotone picture of lines running directionally thereon.

In the transmission of a series of separations showing a color picture, I have found it advisable to shift the position of the successive pictures transmitted upon the cylinder so that the lines running directionally in the picture received shall be in different directions and when combined will form a picture of better quality than if all component separation records were sent in identical position, thus emphasizing the tendency towards the production of directional streaks in the finished color production of the picture. This is accomplished by turning the separation negatives or positives at different angles as illustrated by the separations 40, 42 and 44 in Figure 5 for a three color set and by separations 46, 48, 50 and 52 in Figure 6 for a quadri-color set.

At the point of reception the picture being transmitted is reproduced in the form of multiple monotone prints representing the individual color records transmitted. These may be recognized by the directional lines thereon or may be marked in any other suitable manner to designate the respective color separations. These monotone prints may then be photo-engraved and printed in colors proper to the recorded color sensation results in a color picture composed of multiple colors superposed in the operation of positive printing. Other known photographic processes permit the reproduction by known methods of transmitted color separation records in lithography, photography, and other branches of the graphic arts.

In accordance with the invention it is desirable to receive the records transmitted electrically upon light sensitive material of non-changing nature as to size; Celluloid supported emulsions or non-shrinking paper of waterproof type being applicable to receiving needs. Similar non-expanding, non-shrinking paper may be used in the transmission of color records, prints thereon being made from original color separation negatives or duplicates thereof.

The film illustrated in Figure 7 is a new type of green sensation recording element, particularly suitable for forming a rear element of a bi-pack in combination with the front element of Figure 1.

The new element of Figure 7 consists of a green sensation recording emulsion 54, a transparent support of glass or Celluloid 56 and a gelatine layer 58 pigmented or dyed red with a water-soluble dye as an anti-halation backing.

The red anti-halation backing is of much greater value in this instance, that is, for green sensation recording and red positive printing, in that the rays passing through which might cause halation in this particular sensitivity are much more readily absorbed and made harmless from an anti-halation standpoint by the red layer than by an anti-halation layer of any other color.

Figure 8:
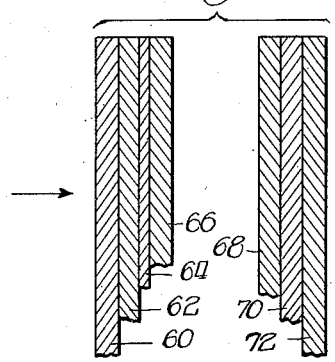
Figure 8 represents a bi-pack film in which the first element is blue and red sensation recording and the second element corresponding to the element of Figure 7 is green sensation recording.

A preferred type of bi-pack having as its rear element the film of Figure 7 is illustrated in Figure 8, in which the first element nearest the camera lens during exposure consists of a Celluloid or glass transparent support 60, a blue sensation recording emulsion 62, a yellow gelatin filter layer 64 in which the dye is non-water-soluble but is soluble in aqueous sodium hydrosulphite, and a red sensation recording emulsion 66, that is, an emulsion which per se is red sensation recording; and the second element consists of a green sensation recording emulsion 68, a Celluloid or glass transparent support 70, and an anti-halation gelatin backing layer water-solubly dyed red 72.

The utilization of these two elements in combination provides complete negative recordings for wire photo transmission of four colors, namely, black, yellow, blue and red, the black printing monotone being made from the shadow sensation dual blue-red sensation recording negative, the yellow monotone being copied from the blue sensation record nearest the lens, the blue monotone being copied from the red sensation recording emulsion behind the yellow filter in the first element, and the red monotone being derived directly from the green sensation recording emulsion of the second element of the bi-pack combination.

The yellow filtrational layer in the first element of the bi-pack of Figure 8 may be water-solubly dyed or so pigmented that although not water-soluble the color may be removed by bleaching, for example, with aqueous sodium hydrosulphite. When this shadow sensation recording combination of blue and red sensation recording emulsions is used in combination with the separately supported green sensation recording emulsion, as shown in Figure 8, the yellow filter layer in the front or shadow sensation recording element causes the rear green sensation recording element to be more correctly green sensation recording.

Figure 9:
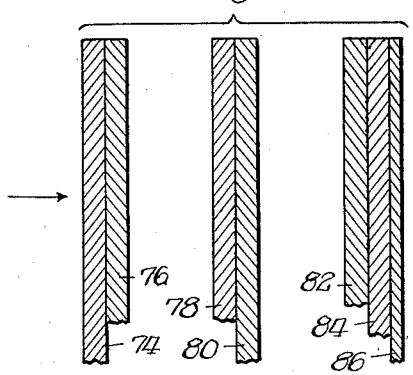
Figure 9 represents a preferred form of tri-pack film in which the first element is red sensation recording, the second element green sensation recording and the third element blue sensation recording.

In Figure 9, the tri-pack illustrated consists of a first element having a Celluloid support 74 with a red sensation recording emulsion 76 thereon; a second element having a green sensation recording emulsion 78 on a Celluloid support 80; and a third element having a blue sensation recording emulsion 82 on a Celluloid support 84 having an anti-halation backing layer 86.

In this new tri-pack the red sensation recording emulsion, that is, the blue printing negative, is nearest the lens during exposure and as blue carries the picture in wire transmission, its sharpness is of greatest importance. Any of the previously described methods of development may be used in preparing separation negatives for electrical transmission from this tri-pack and from either the blue and the red or the green and the red negatives, a single shadow sensation negative may be prepared.

In the electrical transmission of color photography I find it advantageous to photograph the object on a photosensitive negative element of multiple selective color separation characteristics including a photographically neutral layer beween emulsions, which is transparent in its dry state and becomes substantially opaque after subjection to ordinary methods of developing, fixing and washing utilized to develop contrasts in the adjacent multiple emulsions. In other words, the filter layer is of a material which is transparent in its dry state but when subjected to moisture becomes substantially impervious to the transmission of light rays. For this purpose I may incorporate in the neutral appearing gelatin layer a methylene blue (aniline) dye. Other dyes may be similarly employed; also other chemical reactions without the use of dyes, such as tannic acid held in suspense in such a gelatin layer, in combination with a microscopic quantity of eosin or safranine dye, the action of the tannic acid being to isolate the gelatin layer and its dye content from the adjacent emulsion layer.

The principles involved in employing such a potentially darkening gelatin layer will be apparent from the foregoing discussion. This gelatin layer which becomes dark on development provides a dark background for selective copying where the mercuric chloride or mercuric iodide method of whitening is employed.

It will be understood that, while the discussion herein has been descriptive generally of methods in photography involving simultaneous exposure, the invention is not limited to simultaneous exposure methods of photography but is intended to cover the electrical transmission of any set of color separation negatives and such negatives may be made by successive exposures where the objects are not in motion, for instance, in photographing sets of paintings, still life subjects, scenics and portraits.

Some of the principles utilized in accordance with my present invention of electrically transmitting color photographs are described and claimed in my co-pending applications Serial Nos. 741,033, filed August 23, 1934; 115,759, filed December 14, 1936; and 121,536, filed January 21, 1937.

Having thus described the invention, what I claim as new and desire to secure by Letters Patent of the United States is:

1. In the art of electrically transmitting color photographs, the steps which comprise, preparing a photographic film with two photographic records of different portions of the spectrum in superposed relationship upon a single support and having a photographically neutral layer between them, directly electrically transmitting said records to a distant point of destination and electrically reproducing them at said point of destination.

2. In the art of electrically transmitting color photographs, the steps which comprise, preparing a photographic film with two photographic records of different portions of the spectrum in superposed relationship upon a single support and with images in said records viewable by reflected light from opposite sides of the film, directly electrically transmitting each of said records to a distant point of destination and electrically reproducing them at said point of destination.

3. In the art of electrically transmitting color photographs, the steps which comprise, preparing a photographic film with two photographic records of different portions of the spectrum in superposed relationship upon a single support and with the images in said records viewable by transmitted light as a shadow sensation recording, directly electrically scanning both images in combination as a transparency and transmitting said combined records as a whole to a distant point of destination and reproducing them at said point of destination as a single photographic record.

4. In the art of electrically transmitting color photographs, the steps which comprise, preparing a photographic film with two photographic records of different portions of the spectrum in superposed relationship upon a single support with a photographically neutral layer between them and another film containing a single photographic record of a third portion of the spectrum exposed simultaneously with the first film, said first film containing photographic records in the blue region and the red region of the spectrum separated by a photographically neutral layer with one of said records viewable from one side of the film and the other viewable from the other side of the film and said second film containing a photographic record in the green region of the spectrum, directly electrically transmitting said records to a distant point of destination and reproducing them at said point of destination as three separate records.

5. A bi-pack material for color photography comprising in the first element two photographic emulsions carried on a single support and in the second element another photographic emulsion carried on a single support, all of said photographic emulsions being effectively sensitive in different portions of the spectrum and the emulsions in the first element in combination being adapted to act as a shadow sensation recording when developed.

6. A bi-pack material for color photography comprising in the first element two photographic emulsions carried in superposed relationship on a single support and separated by a photographically neutral layer in the second element another photographic emulsion carried on a single support, all of said emulsions being effectively sensitive in different portions of the spectrum with the emulsion farther from the lens during exposure on the first element effectively sensitive in the red region of the spectrum but not in the blue and green regions of the spectrum.

7. A bi-pack material for color photography comprising in the first element in the order nearest the lens during exposure a transparent support, a photographic emulsion sensitive in the blue region of the spectrum but substantially insensitive in the red and green regions of the spectrum, and a photographic emulsion sensitive in the red region of the spectrum but substantially insensitive in the blue and green regions of the spectrum, and on the second element a photographic emulsion sensitive in the green region of the spectrum but substantially insensitive in the red region of the spectrum, a photographically neutral gelatin layer water solubly dyed red and a panchromatic emulsion layer.

8. A bi-pack material for color photography, comprising in the order nearest the lens during exposure in the first element a transparent support, a photographic emulsion sensitive in the blue region of the spectrum but substantially insensitive in the red region and the green region of the spectrum, a photographically neutral layer and a photographic emulsion sensitive in the red region of the spectrum but substantially insensitive in the blue region and the green region of the spectrum, and in the second element a photographic emulsion sensitive in the green region of the spectrum and substantially insensitive in the blue region and red region of the spectrum, a transparent support and an antihalation backing layer.

EDWIN BOWER HESSER.